April 22, 1947.  G. A. SMITH  2,419,468
APPARATUS FOR ORIENTING DRILL STEMS
Filed Oct. 8, 1941  3 Sheets-Sheet 2

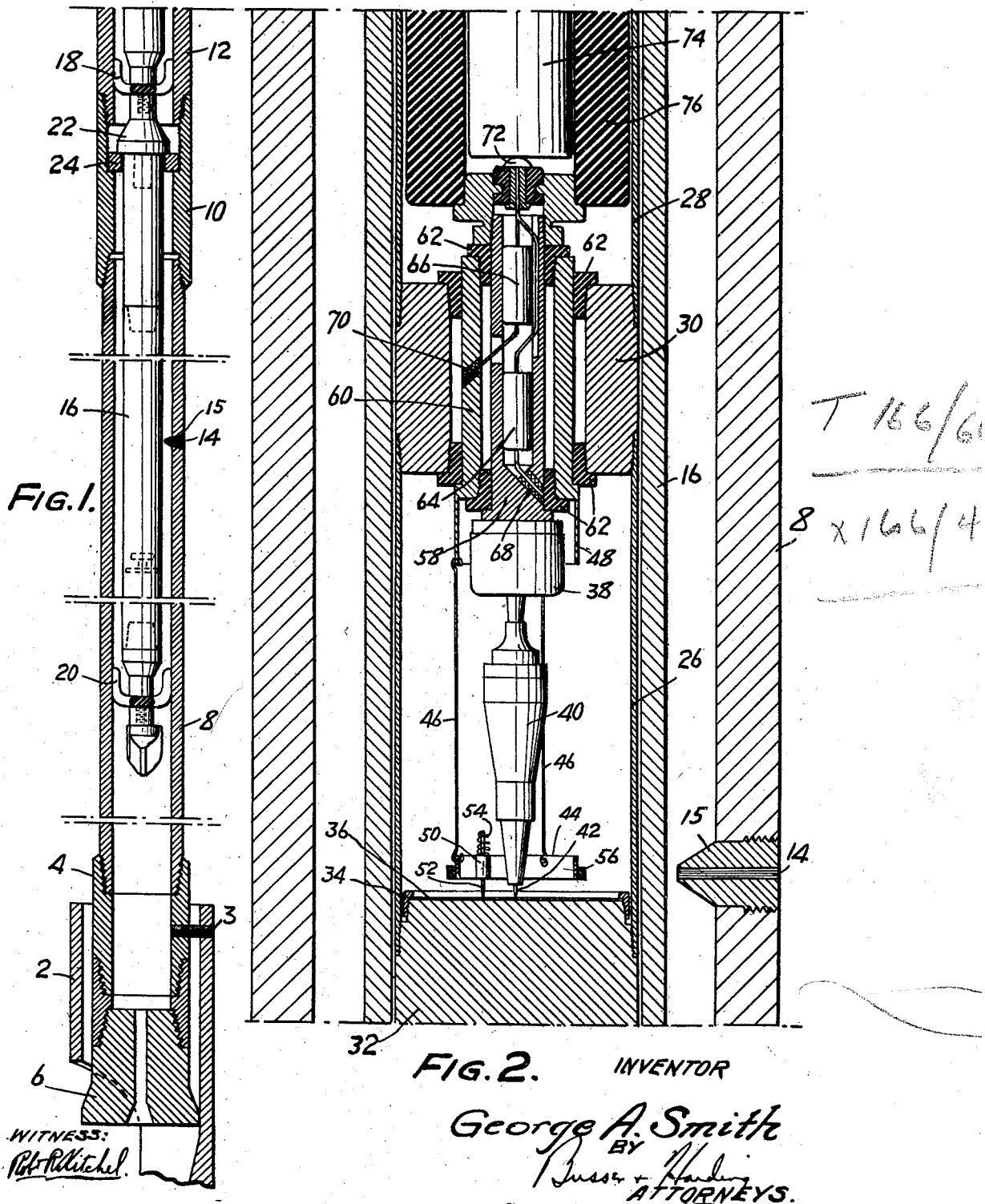
April 22, 1947. G. A. SMITH 2,419,468
APPARATUS FOR ORIENTING DRILL STEMS
Filed Oct. 8, 1941 3 Sheets-Sheet 1

INVENTOR
George A. Smith
BY
ATTORNEYS.

WITNESS:

April 22, 1947.  G. A. SMITH  2,419,468
APPARATUS FOR ORIENTING DRILL STEMS
Filed Oct. 8, 1941    3 Sheets-Sheet 3

WITNESS:

INVENTOR
George A. Smith
BY
ATTORNEYS.

Patented Apr. 22, 1947

2,419,468

UNITED STATES PATENT OFFICE 2,419,468

APPARATUS FOR ORIENTING DRILL STEMS

George A. Smith, Philadelphia, Pa., assignor to Sperry-Sun Well Surveying Company, Philadelphia, Pa., a corporation of Delaware Application October 8, 1941, Serial No. 414,160

16 Claims. (Cl. 255—1.6)

1

This invention relates to a method and apparatus for orienting drill stems and more specifically to a method of orienting drill stems for the purpose of directional drilling.

There is disclosed in Hyer Patent 2,120,670, dated June 14, 1938, a method of orienting drill stems, especially for the purpose of orienting tools, which has been widely and satisfactorily used. In accordance with this method, all mechanical interconnections between a surveying instrument, and drill stem are avoided, the operative interconnection between a surveying instrument and the drill stem being effected through the medium of a magnet located in a portion of the drill stem and adapted to attract a compass within a surveying instrument, desirably of a recording type.

In a patent to Roland Ring 2,246,319, dated June 17, 1941, there is disclosed a type of well surveying instrument which is further disclosed in an application of said Roland Ring, Serial No. 379,835, filed February 20, 1941, which type of instrument is particularly advantageous in that it may be operated without the use of any timing means and in particular for the making of multiple records. Said instrument, briefly involves a pendulum provided with a point engageable with a record member carrying an electrolyte and serving to conduct a current locally to said member to produce electrolytically an indication of the degree of inclination of the apparatus during a period when it is stationary.

It is one object of the present invention to provide a simple apparatus following the recording principles disclosed in said Ring patent and application to carry out an orienting method somewhat similar to that disclbosed in said Hyer patent. Simplicity, however, makes difficult the use of a compass, and consequently an alternative type of device responsive to a magnetic field and taking the form of a pendulum is provided in the apparatus for the purpose of indicating the azimuthal position of a tool such as a whipstock.

By departure from the use of a pivoted compass, a new principle of orientation becomes involved, and it is a further and broader object of the invention to provide a new orientation method and apparatus involving such principle.

The principle is, in fact, substantially broader in its application than to the use of recording or indicating devices of the type disclosed in said Ring patent and application, and is adapted to photographic, radioactive, or other type of recording.

These and other objects of the invention will

2 become apparent from the following description, read in conjunction with the accompanying drawings, in which:

Figure 1 is a vertical section through an assembled apparatus involved in carrying out the invention;

Figure 2 is an enlarged sectional view showing certain details of the recording instrument used in the preferred embodiment of the invention;

Figure 3:
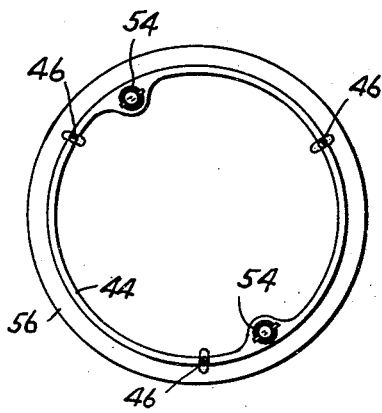
Figure 3 is a plan view showing the pendulum ring of Figure 2 with its suspending rods in section.

Referring first to the modification involving Figures 1 to 4, inclusive, there is illustrated at 2, as an example of a tool adapted to be oriented, a whipstock which is secured by a shear pin 3 to a collar 4 carrying a bit 6 and secured to the lower end of a drill stem section or sub 8, which is coupled by a joint 10 to a further drill stem section 12. The sub 8 in the present case may be of magnetic material such as steel, since in the form of the invention specifically disclosed, there is no compass present to respond to the earth's magnetic field. It will be evident, however, as in the case of the later modification, that a compass responsive to the earth's field may be used to indicate azimuth, in which case the sub should be of a non-magnetic material. Within this sub there is a plug 15 carrying a strong magnet indicated at 14. The plug is desirably of a non-magnetic material such as bronze or the like, so that the magnetic field of the magnet is not short circuited and consequently remains capable of affecting magnetic materials in a surveying instrument located in the sub.

At 16 there is illustrated the protective casing of a surveying instrument provided with rubber guides 18 and 20 for the purpose of centering it in the drill stem and sub and absorbing shocks.

The upper end of the protective casing is provided with an enlarged head 22 adapted to seat on a seating ring 24 located in the joint 10 so as to locate the surveying instrument at a predetermined level during its recording operation. The surveying instrument may be provided in the usual fashion with a suitable sinker bar indicated above it to which is attached a wire line by which it may be lowered and raised within the drill stem. The protective casing of the surveying instrument, at least in the vicinity of the magnet 14 must be of non-magnetic material, so that the field of the magnet is capable of affecting an element inside the casing.

Figure 2 illustrates the principal portions of the surveying instrument proper located within the protective casing 16. This instrument takes the form of a modified surveying instrument of the type illustrated in said Ring patent and application referred to above. It comprises tubular sections 26 and 28 joined by a coupling 30 to provide a casing closed at its upper end by means not illustrated and at its lower end by a plug 32 arranged to be threaded into the lower end of the tube 26 and provided with threads to receive a clamping ring 34 which serves to secure to the plug 32 a recording disc 36 of the type described in said Ring application and patent. This recording disc may be of the various forms there described, and may be generally stated to comprise a paper disc treated with a material adapted to be discolored upon the passage of an electric current by reason of electrolytic action. The disc may be provided with a salt serving to render it conductive upon its being moistened, though in general waters ordinarily available contain sufficient salts to render them conductive without the necessity for supplying an additional conductive salt in the disc itself.

Suspended by a universal joint arrangement indicated at 38 is a pendulum 40 provided with a central bore in which there is adapted to slide a light pin 42 arranged to engage very lightly and with little friction the record disc 36. The mounting of this pendulum and its construction may be the same as in said Ring application and patent.

A ring 44 is suspended by three wires or rods 46 from a depending skirt 48 surrounding the universal joint 38, so that said ring 44 is mounted as a pendulum for universal pivotal movement concentric with the movement of the pendulum 40. To insure such concentricity, the upper suspension of the wires 46 is at the same height as the center of the universal suspension of the pendulum 40. As a result of this suspension, the ring 44 would normally be concentric with the position of the axis of the pendulum 40 represented by the pin 42.

The ring 44 is provided with a pair of bosses 50 in which are vertically slidable pins 52 similar to pin 42 and partially supported by light springs 54, so that they bear upon the record member 36 only very lightly and without setting up substantial friction. An insulating bumper 56 desirably surrounds the ring 44, so that it cannot short circuit to the walls of the instrument.

The universal joint 38 is carried by the lower end of a bored pin 58 which is concentrically arranged within a tube 60, which carries the skirt 48, and coupling member 30 between the tubes 26 and 28. These parts are assembled so as to be insulated from each other by the use of insulating flange rings 62, as illustrated. In order to stabilize the flow of current and secure an even distribution, there are inserted inside the member 58 resistors 64 and 66. The upper leads of these resistors which are insulated from the member 58 are connected together and to a button 72, which is also insulated from the member 58 and tube 60. The lower lead of the upper resistor 66 is insulated from the member 58 and is soldered into an opening 70 in the tube 60 to to make electrical contact therewith. The lower lead of the resistor 64 is similarly soldered into an opening 68 in the member 58 so as to make an electrical contact therewith.

An insulating sleeve 76 within the upper tube 28 serves as a housing for batteries indicated at 74, which may be stacked up in the fashion commonly used in flashlights so as to be in series with each other. The lowermost battery makes electrical contact with button 72, while the uppermost battery is electrically connected to the housing of the instrument and through it with the lower plug 32 by means which need not be shown herein.

When the surveying instrument is located in the position illustrated in Figure 1, i. e., seated on the ring 24, the ring 44, forming the bob of the outer pendulum, is located at the level of the magnet 14 as illustrated in Figure 2. The ring 44 is of soft iron or some other non-retentive magnetic material, so that it will be laterally displaced from a vertical suspended position by reason of attraction by the magnet. All of the other parts of the apparatus in its vicinity and in the vicinity of the magnet are of non-magnetic material so as not to be affected by the magnet nor affect the magnetic field thereof. Because of the spacing between the magnet and the ring 44, the magnet will be capable only of displacing the ring 44 from its vertical suspended position without pulling it fully against the tube 26. The degree to which the magnetic field is capable of displacing the ring is not, however, critical as will be evident from the following description of the operation.

Speaking generally, the apparatus is designed to accomplish substantially the same results as the Hyer apparatus mentioned above. In operation, the whipstock or other tool is lowered into the drill stem attached to the lower end of the sub as illustrated, the drill stem being made up in the usual fashion. Prior to the lowering, the angular relationship of the magnet 14 to the face of the whipstock or to some asymmetrical feature of a directional drilling tool is noted. For example, there may be adopted the arrangement illustrated in Figure 1, in which the magnet is located 180° from the direction in which the whipstock faces. When the whipstock has reached approximately the position where it is to be ultimately set and while it is slightly off the bottom of the hole, for example, a foot or more, the surveying instrument is lowered into the drill stem to a position on seat 24, as illustrated in Figure 1. Before being run into the hole, the instrument is provided with a moistened record disc 36 and the electrical circuit is closed in conventional fashion, for example, in the procedure of locating the inner portions of the instrument within its protective casing by the location of a supporting pin or the like in a T-slot. When the circuit is thus closed at the upper end of the battery or batteries, it is completed through the resistors 64 and 66 in parallel and through the respective pendulum points 42 and 54 in parallel and thence through the disc 36 to the plug 32, constituting in effect the ground of the apparatus. As described in said Ring application and patent, the electrolytic action effecting marking is sufficiently slow so that during the lowering, the motions of the pendulums will prevent the various pins from making any perceptible, or at least any obliterating, marks on the record disc. When the instrument reaches its final position, it is permitted to rest for a sufficient period of time to permit the now stationary pins to effect marking of the record member. Following the marking, the instrument is withdrawn and the record removed and examined. During the withdrawal operation the pendulums are again set in motion so that the record marks which are made are not obliterated or rendered indefinite by reason of the formation of other markings.

Figure 4:
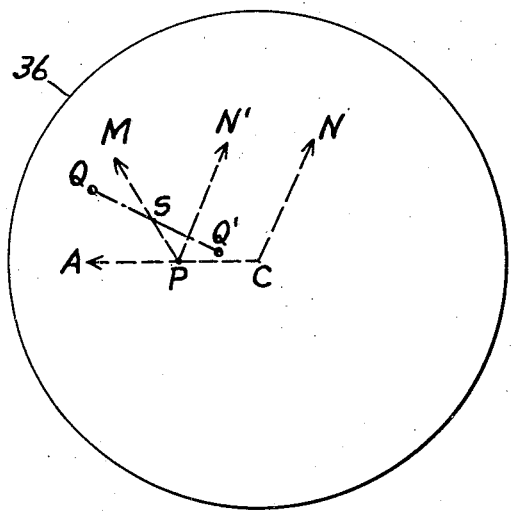
Figure 4 is a plan view of the type of record made by the device, having indicated thereon the calculations basically necessary for interpretation.

The nature of the record and its interpretation may be best made clear by reference to Figure 4. The pins 52 are diametrically opposite each other in the ring 44, so that their center line in the absence of the magnet 14 would pass through the pin 42, which would be located in the exact center of the line between the pins 52 when the parts were at rest. In other words, to a very close approximation for the small angles involved, if the instrument was inclined in any position then the mark produced by the pin 42 on the record disc would bisect a line joining the marks produced by the pins 52. On the other hand, with the magnet present in a position to attract the ring 44, as in the case of actual operation, the line joining the marks produced by the pins 52 would be displaced so that its center would be displaced from the mark produced by pin 42. This condition is illustrated in Figure 4, which shows the type of record obtained comprising the mark P made by the pin 42 and the marks Q and Q' made by the pins 52. A line CP drawn from the center C of the disc through the mark P will give the direction A of the low side of the hole, i. e., the azimuth opposite that in which the hole inclines downwardly. If a line is drawn between Q and Q' as illustrated and its center S is marked, the displacement of S from P in the direction M indicates the direction occupied by the magnet with respect to the axis of the instrument. Thus on the record using as references the center C of the disc and the marks P, Q and Q', the directions A and M are ascertainable.

As in the practice of the Hyer method, a preliminary survey of the hole made either for the purpose of the orientation or at some previous time, will give information as to the azimuth with respect to north of the direction of slope of the hole. Measuring this angle on the disc, the direction N of the north could be marked thereon. If a parallel direction N' is transferred to the point P, it will be evident that the record makes known the angle MPN', namely, the azimuthal angle of the magnet, as measured about the axis of the drill stem, with respect to the north. Since the position of the magnet with respect to the whipstock or some plane of asymmetry of another directional tool is known, a mere matter of addition or subtraction of angles will indicate the direction in which the tool is located or facing. Consequently, by suitable turning of the drill stem, it can be located in the desired position and operations begun, for example, in the case of the whipstock illustrated by shearing the pin 3 after driving the whipstock into the bottom of the hole, and beginning the drilling. Details of these manipulations form no part of the present invention and may be carried out in conventional fashion, including, for example, the customary and known provisions for rotating the drill stem and maintaining its direction ascertainable during the reading and interpretation of the record.

It will be understood that Figure 4 illustrates only the theoretical fashion in which the record is interpretable. Actually, the various angles may be determined by the use of a suitable reading device capable of giving more or less automatically the angles involved and serving for the automatic calculation, if desired, of the position of the tool.

A simple modification of the instrument heretofore described involves the elimination of the electrical circuit including the batteries, resistances, etc., and the provision of radioactive material at the ends of the pins 42 and 52. Preferably this is accomplished by making the pins of small tubes inwardly, of the lower ends of the openings of which the radioactive material is located. In such case, by the use of photographic paper of either printing-out or developing-out type, spots will be produced which will correspond to the markings produced electrolytically as described. If radioactive material of proper degree of activity is used in connection with a suitably sensitive photographic paper, there will in this case also be no record made until the parts occupy stationary positions for a substantial period.

As described in the introduction to the specification, the invention is particularly adaptable to the use of a slightly modified Ring type of instrument, with its advantages of simplicity of operation and absence of timing means, to the orientation of tools on drill stems without involving the necessity for use of a compass. The principle involved, however, may be applied equally well to photographic or other types of instruments as illustrated, particularly, in the modification involved in Figures 5 and 6. In this case, a surveying instrument adapted to be lowered and located in the same fashion as the instrument already described may have in substitution for the parts illustrated in Figure 2 parts such as those illustrated in Figure 5. In this modified form of instrument, a tube 80, corresponding to 26 is closed by a lower plug 82 to which may be threaded a clamping ring 84 adapted to hold a piece of photographic film or paper indicated at 86. In this case a coupling member 88 between the tubular portions of the instrument provides a gimbal mounting of universal type, indicated at 90, for a pendulum 92 which is provided with a bore 94 extending to its lower end 96, which moves in proximity to the sensitized member 86. A lamp 98 located within the gimbal mounting is adapted to project a beam of light through the bore 94 upon the sensitized member.

As in the first described modification, rods or wires 100 provide a pendulum mounting for a ring 102, which is provided with an extension 104 having diametrically opposed openings 106 therein adapted to permit the passage of light from lamps 108 distributed in the upper portion of the pendulum chamber so as to provide fairly uniform illumination therein. These openings 106 are preferably tapered as shown and their lower ends are closely adjacent the photographic disc 86.

As in the other modification, the ring 102, 104 alone is of magnetic material, preferably such as soft iron having a low degree of retentivity, the other parts in its vicinity and adapted to be located in the vicinity of a magnet in a sub being of non-magnetic material so as not to be affected by a magnetic field nor to produce any disturbance in such field.

Figure 5:
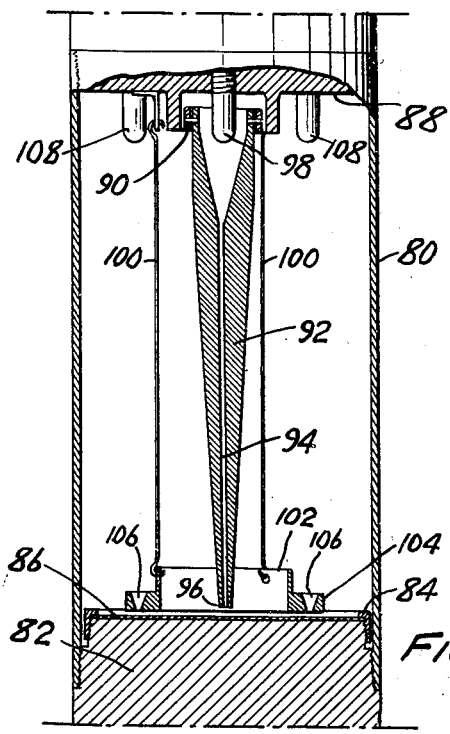
Figure 5 is a fragmentary sectional view similar to Figure 2 and showing an alternative form of device using photographic recording.

Depending upon the intensity of the lamps, and the sensitivity of the photographic paper, which may be either of printing-out or developing-out type, there may or may not be provided a timing arrangement for producing illumination of the lamps. However, because of the particular nature of the instrument disclosed, a timing clock of conventional design and connections is desirably provided to prevent local over-exposure of the film or paper. This, together with the conventional batteries, may be located in a chamber above the pendulum chamber which has been described, and since the arrangement may be quite conventional, there is no need to refer to these matters in detail. It is sufficient to state that the timing device may be of conventional character, maintaining the lamp circuit open for an adjustable period of time sufficient to permit the apparatus to come to the position where the record is to be made and then for closing the circuit for a suitable short interval to permit an exposure, thereafter breaking the circuit and maintaining it open. The modification of Figure 5 is used in substantially the same fashion as that of Figures 1 and 2. Following the lowering of the tool on the drill stem with a magnet such as 14 located in a known position with respect to the tool, the instrument is lowered to bring the ring 102, 104 directly opposite the magnet. The instrument is then permitted to remain in this position until the exposure is made by the operation of the timing means, and the instrument is then withdrawn and the record removed.

Figure 6:
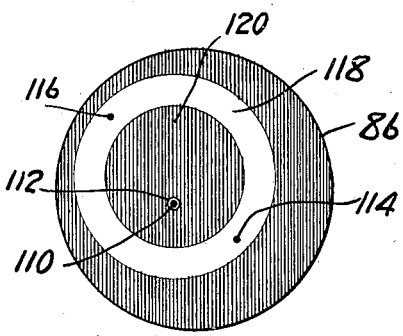
Figure 6 is a plan view of a photographic record made by the device of Figure 5.

The type of record produced, either without development if printing-out paper is used, or after development if a developing-out paper is used, is illustrated in Figure 6. The beam of light through the opening 94 in the inner pendulum will produce a darkened spot such as indicated at 110 which will be surrounded by a light region 112 corresponding to the shadow of the lower end 96 of the pendulum 92. Darkened spots 114 and 116 will be produced by the light passing through the small openings 106. These spots will be located in an unexposed annular region 118 constituting the shadow of the ring 102, 104. The remainder of the photographic disc will be darkened as indicated at 120.

The significance of the spots 110, 114 and 116 is identical with that of the previous modification, the displacement of the center of a line joining the spots 114 and 116 relative to the spot 110 indicating the direction of the magnet. From the results of a previous survey of the hole and the displacement of the spot 110 from the center of the record, the same information is obtained as described in Figure 4, whereby the azimuthal position of the tool may be ascertained.

Reference to the Hyer patent will indicate the applicability of the method described herein to an apparatus in which, instead of using a pendulum such as 40 or 92 for indirectly giving the azimuth by the use of data from a preliminary survey, a compass is used directly to indicate azimuth.

In both of the forms heretofore described an advantageous, though unessential modification would involve the provision of another pair of pins or openings to provide an array of four markings such that the intersection of lines drawn between opposite pairs will accurately define a mid point such as S in Figure 4.

Figure 7:
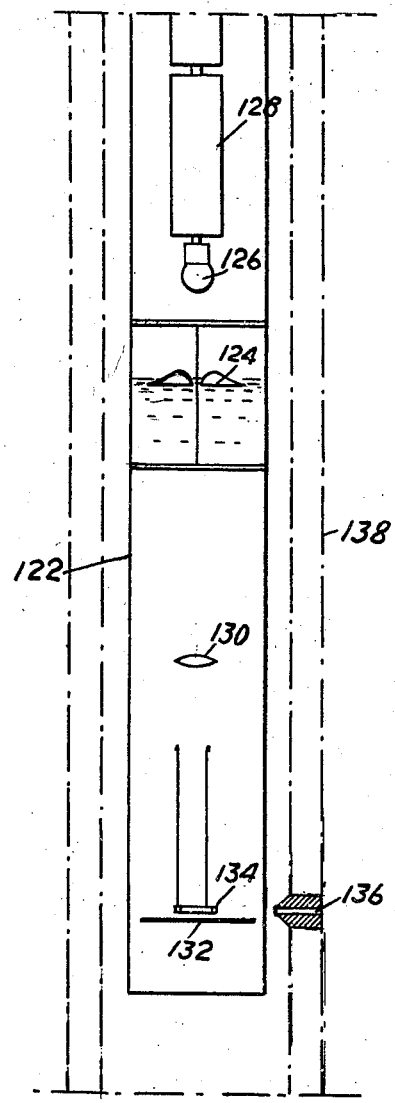
Figure 7 is a diagrammatic view illustrating still another modification embodying the principles of the invention.

In Figure 7 there is shown in outline form a further type of apparatus designed to carry out the improved method. In this figure the parts are diagrammatically shown, rather than detailed, since their details will be apparent from what has been described heretofore and from the patents to Hewitt 2,116,350, dated May 3, 1938, and Hewitt et al. 2,169,342, dated August 15, 1939, which patents, in fact, show the mechanical details of the surveying instrument indicated at 122. This surveying instrument comprises a floating compass 124 responsive to the magnetic field of the earth and adapted to be illuminated by transmitted light by a bulb 126 energized by batteries 128 subject to control by a timing mechanism which is not illustrated, but which may be of the type shown in said Hewitt Patent 2,116,350. A lens 130 projects an image of the card of the compass 124 upon a photographic paper or film disc 132. Adjacent to this there moves a ring 134 carrying cross-hairs marking its center, suspended by wires or rods as described heretofore and as illustrated in said Hewitt patent. The instrument, in fact, is identically that of the two Hewitt patents, with the exception that the pendulum ring 134 should be of soft iron or other non-retentive magnetic material, as in the case of the pendulums heretofore described, and the parts in its vicinity should be of non-magnetic material.

The use of this well surveying apparatus for carrying out the method is substantially the same as the use of the apparatus of Figure 5, with the exception that in this case the magnet 136, to the level of which the pendulum ring 134 is lowered, is located in a sub of non-magnetic material indicated at 138. This sub must be of non-magnetic material, at least in the vicinity of the compass 124, so that this compass may respond to the earth's magnetic field to indicate magnetic north. The arrangement must be such that the compass is sufficiently spaced from the magnet 136 so as not to be affected thereby.

Figure 8:
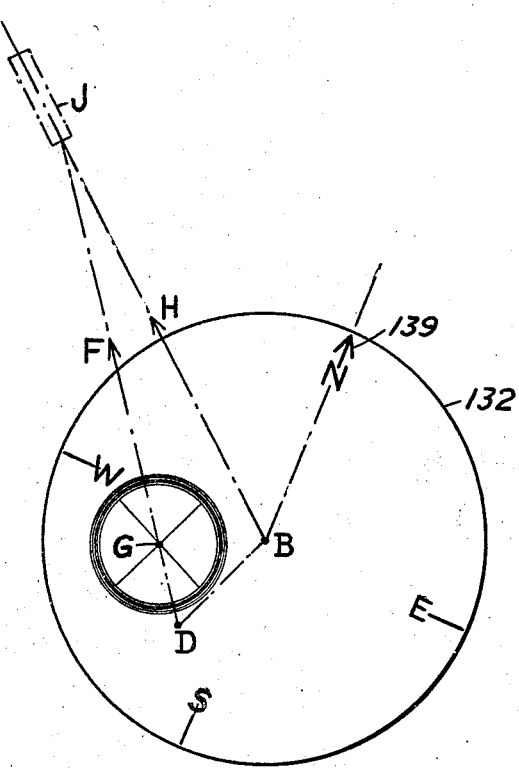
Figure 8 is a plan view of the type of record produced by the apparatus of Figure 7, together with diagrammatic indications of its mode of interpretation.

The record made in this apparatus when an orienting reading is made is illustrated in Figure 8, which indicates the appearance of the disc 132 (reversed from the actual negative produced) after its development. A disc will contain compass indications such as indicated at 139, preferably with intermediate degree marks, which are not illustrated in Figure 8. The other matter shown on the record is the image, of shadowgraph type, of the ring 134 and its cross-hairs, the intersection of which is indicated at G. This record may be used to determine the azimuthal position of the tool in the following fashion:

From information obtained in a previous survey of the hole, the inclination and direction of inclination at the point where the record is made will be known. Consequently, by measurement from the center point B of the record disc, to a proper distance and at a proper angle, a point D may be ascertained which would be the point the cross-hairs should occupy if the magnet 136 was not present, i. e., if the pendulum was hanging vertically. The direction from the point D to the point G of intersection of the cross-hairs, namely, the direction F, will then be the direction in which the magnet is located relative to the apparatus at the time the record was made. From this, the azimuthal position of the tool may then be ascertained.

It will be noted, as above mentioned, that there will be some slight errors if the angles of inclination involved are substantial. In this case, and where great accuracy is required, a direction obtained, for example, as indicated in Figure 8, may be corrected to take care of the error introduced by the fact that when the magnet attracts the pendulum, the pendulum may not be centered or closely adjacent the center of the record disc. For example, in the illustration of Figure 8, it will be evident that the magnet producing a deflection of the pendulum in the direction F may actually be in a direction H from the center of the drill stem or sub. The geometrical dimensions of the apparatus will make it readily possible to calculate the true position of the magnet, as indicated by the continuation of the direction lines F and H to the magnet J diagrammatically illustrated in Figure 8. This may be accomplished, for example, by making a geometrical figure of the type illustrated in Fig. 8 by continuing a line DG to intersect a circle concentric with the disc and having a radius equal to the distance of the inner end of the magnet from the center of the instrument. A line drawn from B to this intersection (i. e., BH) will give the true direction of the magnet. The same considerations, of course, apply to the interpretation of the records of the other modifications. Tables or the like may be provided to indicate the necessary corrections. The inherent errors in directional drilling, however, make quite unnecessary going to any great lengths to correct such deviations.

What I claim and desire to protect by Letters Patent is:

1. In combination, a hollow drill stem; a tool carried by the drill stem; an instrument arranged to pass through the drill stem and arranged to occupy a predetermined final longitudinal position therein adjacent the tool, said instrument containing means for indicating a known azimuthal reference direction, a pendulum subject to attraction by a magnet, and means for recording the indications of said pendulum and said azimuth indicating means; and a magnet carried by the drill stem in the immediate vicinity of said pendulum when the instrument is in said final position whereby said magnet will deflect said pendulum from a vertical position to give an indication of the position of the drill stem relative to the instrument.

2. In combination, a hollow drill stem; a tool carried by the drill stem; an instrument arranged to pass through the drill stem and arranged to occupy a predetermined final longitudinal position therein adjacent the tool, said instrument containing a pair of pendulums, one of which is subject to attraction by a magnet, and means for recording the indications of both said pendulums; and a magnet carried by the drill stem in the immediate vicinity of said attractable pendulum when the instrument is in said final position whereby said magnet will deflect said attractable pendulum from a vertical position to give an indication of the position of the drill stem relative to the instrument.

3. An instrument arranged to pass through a drill stem for orientation purposes and adapted to cooperate with a magnet carried by the drill stem comprising a casing, means for indicating a known azimuthal reference direction means subject to attraction by a magnet, and means for recording the indications of said azimuth indicating means and said means subject to attraction by a magnet, said last mentioned means comprising a pendulum.

4. An instrument arranged to pass through a drill stem for orientation purposes and adapted to cooperate with a magnet carried by the drill stem comprising a casing, a pair of pendulums, one of which is subject to attraction by a magnet, and means for recording the indications of both said pendulums.

5. In combination, a hollow drill stem; a tool carried by the drill stem; an instrument arranged to pass through the drill stem and arranged to occupy a predetermined final longitudinal position therein adjacent the tool, said instrument containing means for indicating a known azimuthal reference direction, a substantially non-retentive pendulum subject to attraction by a magnet, and means for recording the indications of said azimuth indicating means and said pendulum; and a magnet carried by the drill stem in the immediate vicinity of said pendulum when the instrument is in said final position whereby said magnet will deflect said pendulum from a vertical position to give an indication of the position of the drill stem relative to the instrument.

6. In combination, a hollow drill stem; a tool carried by the drill stem; an instrument arranged to pass through the drill stem and arranged to occupy a predetermined final longitudinal position therein adjacent the tool, said instrument containing a pair of pendulums, one of which is substantially non-retentive and subject to attraction by a magnet, and means for recording the indications of both said pendulums; and a magnet carried by the drill stem in the immediate vicinity of said attractable pendulum when the instrument is in said final position whereby said magnet will deflect said attractable pendulum from a vertical position to give an indication of the position of the drill stem relative to the instrument.

7. An instrument arranged to pass through a drill stem for orientation purposes and adapted to cooperate with a magnet carried by the drill stem comprising a casing, means for indicating a known azimuthal reference direction, substantially non-retentive means subject to attraction by a magnet, and means for recording the indications of said azimuth indicating means and said means subject to attraction by a magnet, said last mentioned means comprising a pendulum.

8. An instrument arranged to pass through a drill stem for orientation purposes and adapted to cooperate with a magnet carried by the drill stem comprising a casing, a pair of pendulums, one of which is substantially non-retentive and subject to attraction by a magnet, and means for recording the indications of both said pendulums.

9. In combination, a hollow drill stem; a tool carried by the drill stem; an instrument arranged to pass through the drill stem and arranged to occupy a predetermined final longitudinal position therein adjacent to the tool, said instrument containing means for indicating a known azimuthal reference direction, means subject to attraction by a magnet and adapted, in the absence of a magnet, to assume a predetermined position under the action of gravity, and means for recording the indications of said azimuth indicating and magnetically attractable means; and a magnet carried by the drill stem in the immediate vicinity of said magnetically attractable means when the instrument is in said final position whereby said magnet will deflect said magnetically attractable means from a position which it would assume under the action of gravity to give an indication of the position of the drill stem relative to the instrument.

10. In combination, a hollow drill stem; a tool carried by the drill stem; an instrument arranged to pass through the drill stem and arranged to occupy a predetermined final longitudinal position therein adjacent to the tool, said instrument containing means for indicating inclination, means subject to attraction by a magnet and adapted, in the absence of a magnet, to assume a predetermined position under the action of gravity, and means for recording the indications of said inclination indicating and magnetically attractable means; and a magnet carried by the drill stem in the immediate vicinity of said magnetically attractable means when the instrument is in said final position whereby said magnet will deflect said magnetically attractable means from a position which it would assume under the action of gravity to give an indication of the position of the drill stem relative to the instrument.

11. An instrument arranged to pass through a drill stem for orientation purposes and adapted to cooperate with a magnet carried by the drill stem comprising a casing, means for indicating a known azimuthal reference direction, means subject to attraction by a magnet and adapted, in the absence of a magnet, to assume a predetermined position under the action of gravity, and means for recording the indications of said azimuth indicating and magnetically attractable means.

12. An instrument arranged to pass through a drill stem for orientation purposes and adapted to cooperate with a magnet carried by the drill stem comprising a casing, means for indicating inclination, means subject to attraction by a magnet and adapted, in the absence of a magnet, to assume a predetermined position under the action of gravity, and means for recording the indications of said inclination indicating and magnetically attractable means.

13. In combination, a hollow drill stem; a tool carried by the drill stem; an instrument arranged to pass through the drill stem and arranged to occupy a predetermined final longitudinal position therein adjacent to the tool, said instrument containing means for indicating a known azimuthal reference direction, substantially non-retentive means subject to attraction by a magnet and adapted, in the absence of a magnet, to assume a predetermined position under the action of gravity, and means for recording the indications of said azimuth indicating and magnetically attractable means; and a magnet carried by the drill stem in the immediate vicinity of said magnetically attractable means when the instrument is in said final position whereby said magnet will deflect said magnetically attractable means from a position which it would assume under the action of gravity to give an indication of the position of the drill stem relative to the instrument.

14. In combination, a hollow drill stem; a tool carried by the drill stem; an instrument arranged to pass through the drill stem and arranged to occupy a predetermined final longitudinal position therein adjacent to the tool, said instrument containing means for indicating inclination, substantially non-retentive means subject to attraction by a magnet and adapted, in the absence of a magnet, to assume a predetermined position under the action of gravity, and means for recording the indications of said inclination indicating and magnetically attractable means; and a magnet carried by the drill stem in the immediate vicinity of said magnetically attractable means when the instrument is in said final position whereby said magnet will deflect said magnetically attractable means from a position which it would assume under the action of gravity to give an indication of the position of the drill stem relative to the instrument.

15. An instrument arranged to pass through a drill stem for orientation purposes and adapted to cooperate with a magnet carried by the drill stem comprising a casing, means for indicating a known azimuthal reference direction, substantially non-retentive means subject to attraction by a magnet and adapted, in the absence of a magnet, to assume a predetermined position under the action of gravity, and means for recording the indications of said azimuth indicating and magnetically attractable means.

16. An instrument arranged to pass through a drill stem for orientation purposes and adapted to cooperate with a magnet carried by the drill stem comprising a casing, means for indicating inclination, substantially non-retentive means subject to attraction by a magnet and adapted, in the absence of a magnet, to assume a predetermined position under the action of gravity, and means for recording the indications of said inclination indicating and magnetically attractable means.

GEORGE A. SMITH.

REFERENCES CITED

The following references are of record in the file of this patent:

UNITED STATES PATENTS

| Number | Name | Date |
|---|---|---|
| 2,120,670 | Hyer | June 14, 1938 |
| 2,246,417 | Smith | June 17, 1941 |
| 2,152,671 | Smith | Apr. 4, 1939 |
| 2,246,319 | Ring | June 17, 1941 |
| 2,268,682 | Webb | Jan. 6, 1942 |
| 2,116,350 | Hewitt | May 3, 1938 |
| 2,126,740 | Culbertson | Aug. 16, 1938 |
| 2,144,422 | Anderson | Jan. 17, 1939 |
| 2,167,071 | Henderickson | July 25, 1939 |
| 2,173,745 | Hoard | Sept. 19, 1939 |
| 2,327,658 | Miller | Aug. 24, 1943 |